United States Patent [19]

Mendelson et al.

[11] Patent Number: 5,930,830
[45] Date of Patent: Jul. 27, 1999

[54] SYSTEM AND METHOD FOR CONCATENATING DISCONTIGUOUS MEMORY PAGES

[75] Inventors: Abraham Mendelson, Haifa, Israel; Ronald Mraz, South Salem, N.Y.; Lucas Aaron Womack, Bowie, Md.

[73] Assignee: International Business Machines Corporation, Armonk, N.Y.

[21] Appl. No.: 08/783,599

[22] Filed: Jan. 13, 1997

[51] Int. Cl.[6] ................................................ G06F 12/02
[52] U.S. Cl. ........................ 711/171; 711/173; 711/170; 711/206
[58] Field of Search .................................. 711/153, 156, 711/165, 170, 171, 172, 173, 201, 203, 205, 206, 207, 208, 209, 210, 221, 6; 395/200.01, 200.02, 200.13, 200.16, 200.17, 885, 894; 707/205, 206

[56] References Cited

U.S. PATENT DOCUMENTS

| | | | |
|---|---|---|---|
| 4,037,215 | 7/1977 | Birney et al. | 711/202 |
| 4,660,130 | 4/1987 | Bartley et al. | 711/209 |
| 4,775,932 | 10/1988 | Oxley et al. | 707/206 |
| 5,058,003 | 10/1991 | White | 711/209 |
| 5,109,496 | 4/1992 | Beausoliel et al. | 711/207 |
| 5,386,524 | 1/1995 | Lary et al. | 711/206 |
| 5,426,748 | 6/1995 | Brenza et al. | 711/203 |
| 5,465,343 | 11/1995 | Henson et al. | 711/112 |
| 5,539,899 | 7/1996 | Huynh et al. | 711/171 |

OTHER PUBLICATIONS

Doyle et al., ed., *Microsoft Press Computer Dictionary*, 2nd ed, Microsoft Press, 1994, pp. 371 and 412.

*Primary Examiner*—John W. Cabeca
*Assistant Examiner*—J. Peikari

[57] ABSTRACT

A system and method are provided which significantly speed up the ability to reassemble network message transfer units (MTUs) using existing virtual memory systems. Discontiguous physical pages are rearranged in a continuous format in virtual memory by manipulating virtual page pointers in a hardware memory page table. The hardware memory page table provides any necessary virtual-to-real address translations during the execution of a process.

12 Claims, 3 Drawing Sheets

SYSTEM AND METHOD FOR CONCATENATING DISCONTIGUOUS MEMORY PAGES

BACKGROUND OF THE INVENTION

1. Field of the Invention

The present invention relates generally to segmenting and reassembling message transfer units (MTU) and placing them in a memory, and more particularly to a system and method for concatenating and reassembling discontiguous MTUs via virtual memory address reassignment.

2. Description of Prior Art

One way for improving the performance of computer networks is through the use of DMA (Direct Memory Access) based protocols which automatically segment and reassemble ATM (Asynchronous Transfer Mode) cells and place them, in sequence, in memory segments or pages which are typically discontiguous in a host computer's memory. This technique eliminates the need for system software to copy data to and from the host memory to the communications card during data transmissions, yielding effectively a zero-copy interface.

However, this technique is ineffective when the system software receives network message transfer units (MTU) that exceed the size of a single hardware page. One adhoc solution is to use pre-allocated MTU-sized buffers of contiguous pages to store incoming data from an I/O card, e.g., a communications card. This solution, however, puts a strain on the operating system for memory resources, since it has to allocate contiguous physical memory for the incoming data. A resource-efficient solution is to reassemble discontiguous pages by copying them into a contiguous virtual region of memory. This technique solves the resource problem, but is plagued by being a slow memory copy (memcopy) operation, which limits its performance.

Accordingly, a need exists for a system and method which uses existing virtual memory systems to allow for a zero-copy transfer for MTUs larger than the memory page size and which is faster than traditional memcopy re-assembly.

SUMMARY OF THE INVENTION

The present invention provides a system and method for Virtual Memory MTU Reassembly (VMMR) which avoids the resource demands of pre-allocated contiguous buffers and the slow performance of memcopy operations. In the VMMR procedure, discontiguous pages are concatenated and reassembled via virtual memory address reassignment. The present invention includes a method for concatenating discontiguous memory pages in a processor. The method includes the steps of receiving a block of data that exceeds the size of a system page; writing portions of the block of data to two or more system memory pages to store the entire data block using two or more system memory pages; and assigning contiguous virtual addresses to the two or more system memory pages.

The present disclosure also relates to a system for concatenating discontiguous memory pages in a processor. The system includes a receiver for receiving a block of data that exceeds the size of a memory page within the processor; a physical storage area having a plurality of physical addresses each identifying the location of a physical memory page, where the block of data is stored within two or more physical memory pages; a virtual storage area having a plurality of virtual addresses each identifying the location of a corresponding virtual memory page, where the block of data is stored within two or more virtual memory pages; and a page table having virtual-to-real address mappings for tracking the location of the block of data in the virtual storage area.

Advantageously, the system and method of the present invention as mentioned above is faster than the traditional memcopy approach. The system and method of the present invention can also be used to allocate large contiguous buffers on demand, since the hardware page table can be used to locate a block of unused virtual memory to serve as the contiguous buffers.

Many other objects and purposes of the invention will be clear from the following detailed description of the drawings.

DETAILED DESCRIPTION OF THE PREFERRED EMBODIMENTS

The system and method of the present invention rearranges discontiguous physical pages by manipulating virtual page pointers in a hardware page table. Although physical pages remain discontiguous in physical memory, they are made contiguous in virtual memory. The page table provides any necessary virtual-to-real address translation. A system describing a page table configuration is disclosed in U.S. Pat. No. 5,109,496 issued on Apr. 28, 1992 to Beausoleil et al. the contents of which are incorporated herein by a reference.

Figure 1:
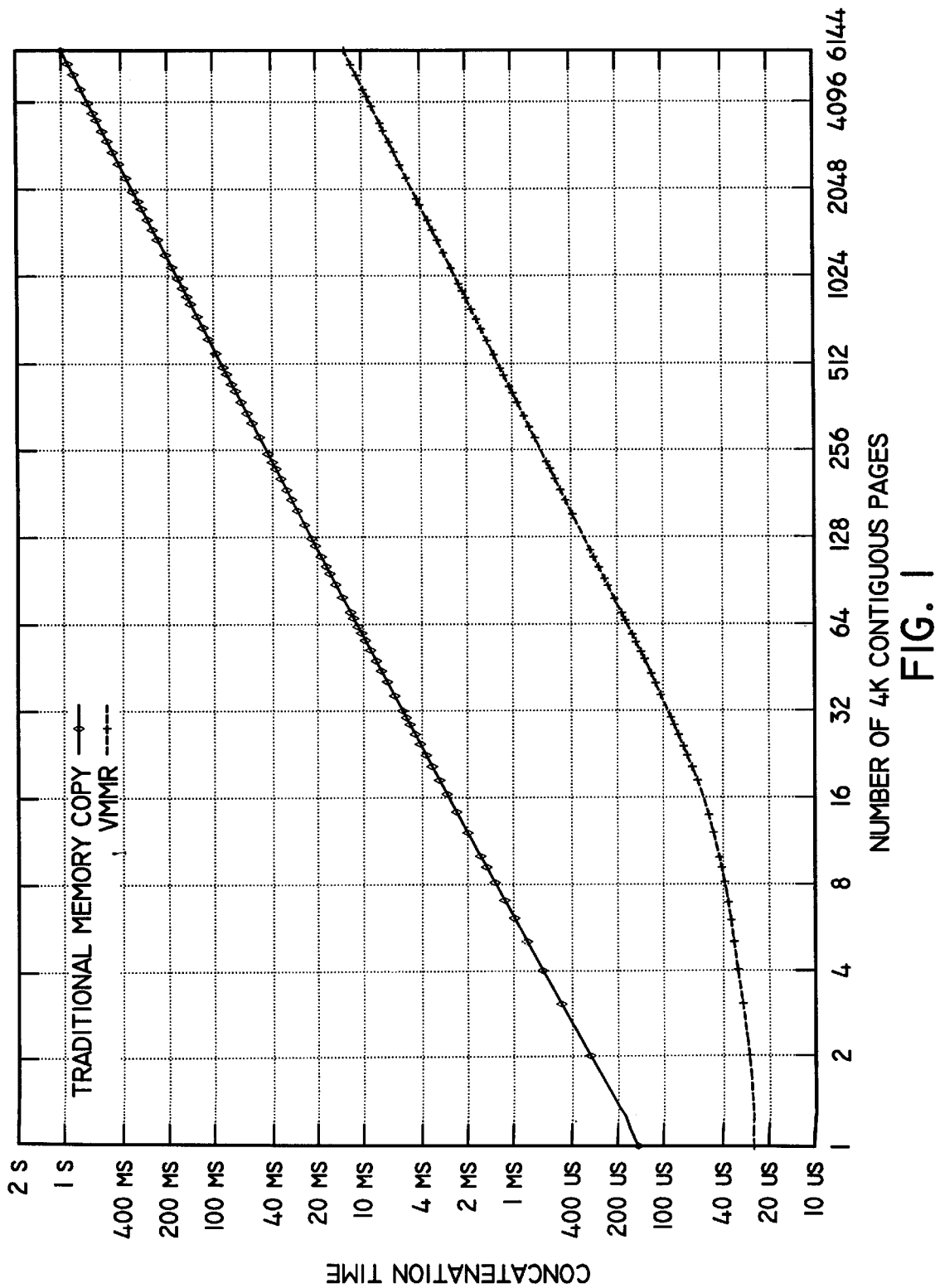
FIG. 1 is a graph which compares a traditional memcopy and a Virtual Memory MTU Reassembly (VMMR) procedure of the present invention.

FIG. 1 depicts an illustrative chart comparing times required by the traditional memcopy approach and the VMMR procedure to concatenate, for example, from 1 to 6,144 hardware pages (4 kB each). For the memcopy approach the times rise exponentially (shown linearly on the log-log graph in FIG. 1) from approximately 200 usec (1 page) to 1 sec (6,144 pages). The VMMR curve reports the times required to re-assemble a non-contiguous MTU of 1 to 6,144 pages. At small message sizes (32 pages or less), VMMR speedup over memcopy ranges between 6 and 80. For larger message sizes (greater than 32 pages), VMMR speedup is constant at approximately 82. Therefore, the VMMR procedure of the present invention is faster over traditional memcopy operations, since it utilizes the host computer's virtual memory and a hardware page table to map the real address of an MTU to its virtual address without copying the MTU to the virtual region.

Figure 2:
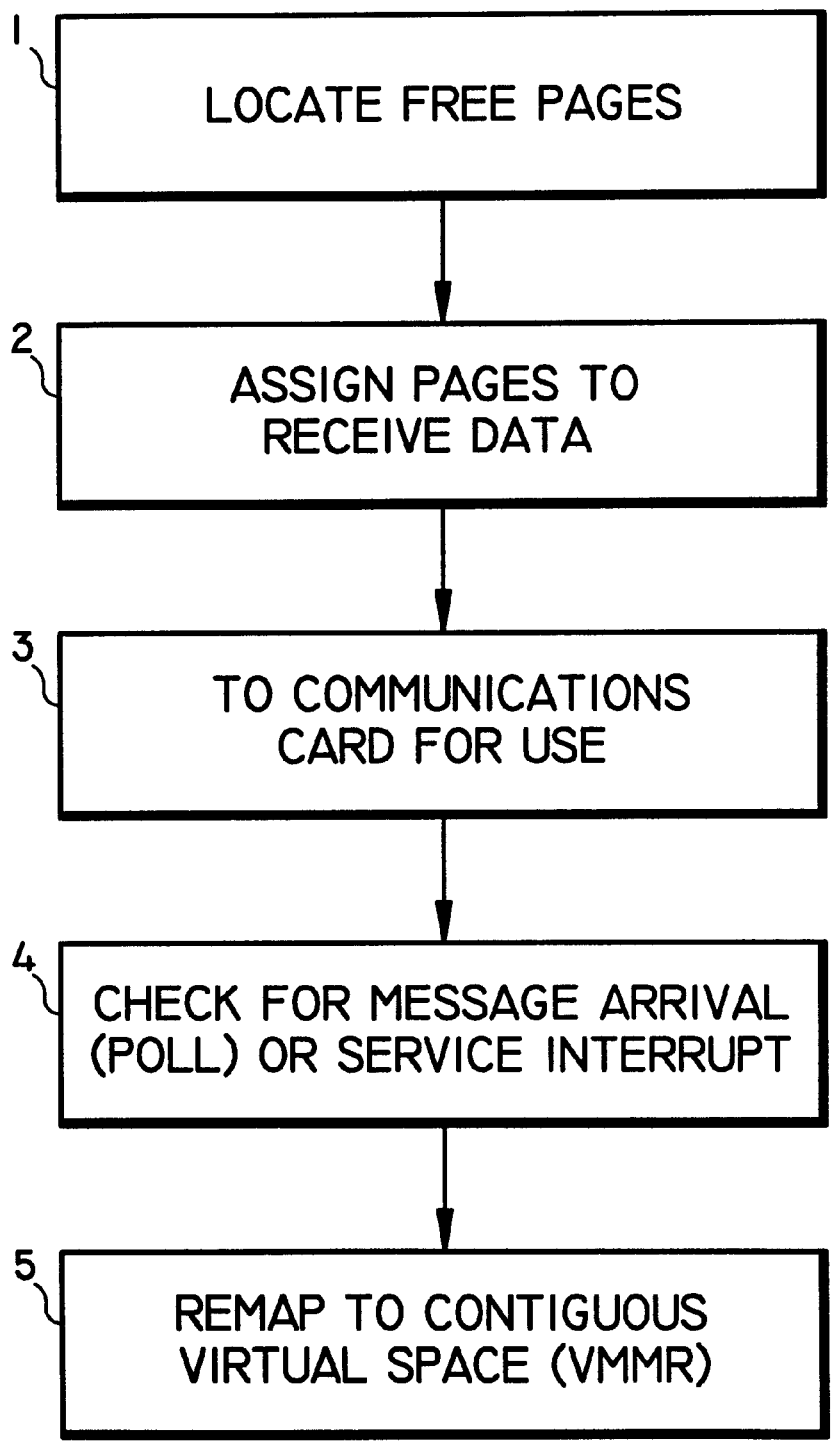
FIG. 2 is a flowchart illustrating an implementation of VMMR within an operating system.

With reference to FIG. 2 there is shown a flowchart of an illustrative implementation of a Virtual Memory MTU Reassembly (VMMR) process of the present invention within an operating system. When an application or user process makes a system call to the operating system notifying the operating system to attach the application to a network device, a kernel locates a set of free pages within physical memory (Block 1). These free pages need not be contiguous and/or adjacent. The operating system allocates these pages for the user process requesting them (Block 2), and the operating system notifies the communications card of available physical pages that can be used by the operating system to receive or store the arriving MTUs into memory (Block 3). The process then polls the communications card or awaits an interrupt notifying that one or multiple fragmented MTUs have arrived and have been written to memory (Block 4). When this step has been completed, the kernel invokes the VMMR routine to reassemble each MTU in virtual memory (Block 5) and the physical pages are left untouched. The VMMR then returns a virtual memory pointer which represents the starting location of a contiguous MTU that is passed on to a protocol stack (see FIG. 3) for further processing. In a high-performance parallel processing interface, VMMR reassembles MTUs received as discontiguous pages and forwards them to an awaiting application, bypassing the protocol stack.

Figure 3:
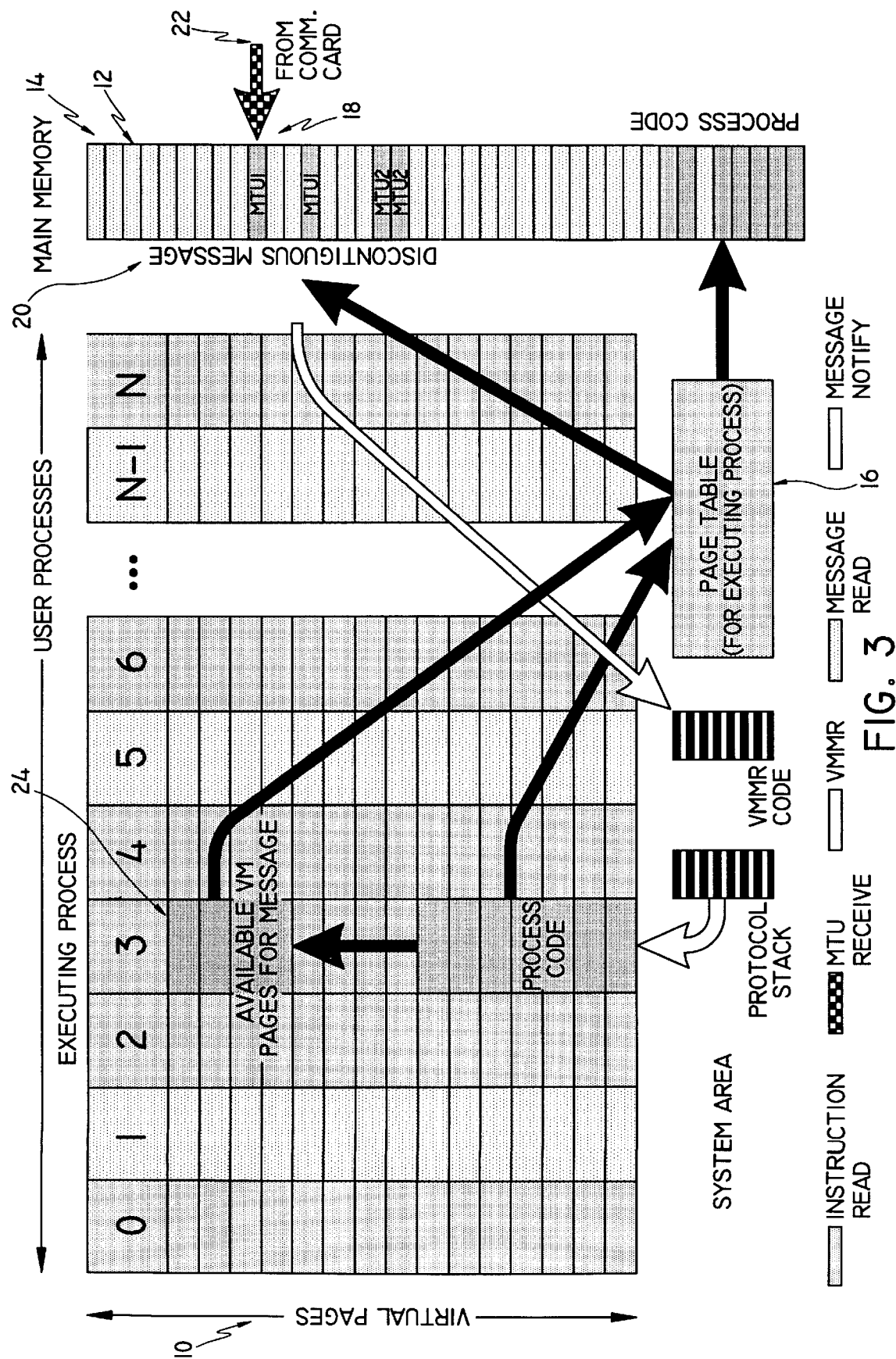
FIG. 3 is a graph of a system implementation in which an illustrative VMMR procedure according to the present invention is used.

FIG. 3 is a graph of a system implementation in which an illustrative VMMR procedure according to the present invention is used in conjunction with an operating system. The operating system manages a number of user processes at any one time, and each process has a set of virtual pages 10 which translate to appropriate physical pages 12 in the main memory 14 through the page table 16. The page table 16 may include mappings for the currently executing process. When an MTU is received at 18 and stored into physical memory 14 from the communications card 22, the memory 14 storing the MTU is usually discontiguous 20. An area of unused virtual memory 24 for the process awaiting the MTU is then declared and used by the VMMR routines to remap the physical pages 12. The process reads the MTU by reading the virtual memory pages 10 in a sequential order. It is completely unaware that the VMMR has updated the page table 16 to provide mappings from virtual memory space 24 to physical memory space 14.

During context switching, the table is usually paged out to memory or swapped to a disk or hard drive and a new page table for the scheduled process is placed in the system area before the switch is completed. In many traditional UNIX-based operating systems, a VMMR may be done after a context switch has occurred. This is because the process that was waiting for an MTU has usually been placed on an operating system sleep queue by the time the MTU arrives. The operating system may then swap out the currently executing process, brings in the sleeping one (and its page table) from the appropriate disk location, and subsequently performs the VMMR.

For a VMMR to work, an operating system has to maintain some pool of free contiguous virtual pages. In the illustrative implementation described herein, a bitmap 26 is used to represent pages in some reserved area of virtual memory set aside by the operating system, for example during bootup or at application runtime. Generally, the executing process receives a set of physical pages as an operating parameter. The executing process then searches for a starting bit within the bitmap 26 of a contiguous set of unallocated bits equal to the number of pages requiring re-assembly. Once this bit has been found, it is converted to a starting virtual memory address (this is later returned to the application), and appropriate page table entries are added or modified to provide a transparent re-assembly. An example is provided and compared to memcopy further below.

The VMMR procedure can be optimized by reducing the bit search time. This is done by managing several bitmaps 26 of various sizes; each bitmap 26 has bits representing some fixed number of pages. Therefore, one bitmap 26 may include bits, each of which represent one page; another bitmap 26 includes bits, each of which represent two pages; and so on. When the optimized VMMR routines are called, the number of physical pages requiring re-assembly is determined, and an appropriately sized bitmap 26 is used. The free set search time drops dramatically because a set could be represented by a single bit. FIG. 1 illustrates a performance curve derived from this optimization technique.

An example illustrating and comparing the memcopy approach and the VMMR procedure follows, where a communications card has filled four pages of 4096 bytes each in the main memory in the following sequence: $1000_{16}$, $7000_{16}$, $5000_{16}$ and $3000_{16}$. The memcopy approach and the VMMR procedure relocate this 16 kB MTU in a single block starting at hex address $100000_{16}$. It is noted that steps 3 to 6 of the VMMR procedure are faster than steps 3 to 6 of the memcopy approach.

Memcopy

1. Wait for an MTU to arrive ($1000_{16}$, $7000_{16}$, $5000_{16}$ and $3000_{16}$).
2. Find a free address region for reassembly ($100000_{16}$).
3. Copy the region $1000_{16}$-$1FFF_{16}$ to $100000_{16}$-$100FFF_{16}$.
4. Copy the region $7000_{16}$-$7FFF_{16}$ to $101000_{16}$-$101FFF_{16}$.
5. Copy the region $5000_{16}$-$5FFF_{16}$ to $102000_{16}$-$102FFF_{16}$.
6. Copy the region $3000_{16}$-$3FFF_{16}$ to $103000_{16}$-$103FFF_{16}$.
7. Inform application that a new MTU has arrived and is located at starting location $100000_{16}$.

VMMR

1. Wait for an MTU to arrive ($1000_{16}$, $7000_{16}$, $5000_{16}$ and $3000_{16}$).
2. Get a 16 kB area of contiguous virtual address space for reassembly ($100000_{16}$).
3. Assign virtual address $100000_{16}$ to reference memory at the region $1000_{16}$-$1FFF_{16}$.
4. Assign virtual address $101000_{16}$ to reference memory at the region $7000_{16}$-$7FFF_{16}$.
5. Assign virtual address $102000_{16}$ to reference memory at the region $5000_{16}$-$5FFF_{16}$.
6. Assign virtual address $103000_{16}$ to reference memory at the region $3000_{16}$-$3FFF_{16}$.
7. Inform application that a new MTU has arrived and is located at starting location $100000_{16}$.

The appendix attached hereto includes source code for implementing a VMMR procedure according to the present disclosure.

Many changes and modifications in the above-described embodiment of the invention can of course, be carried out without departing from the scope thereof. Accordingly, that scope is intended to be limited only by the scope of the appended claims.

Appendix

VMMR Bimap Search Code (bitmap.s)

```
                .globl      ._searchBitmap
._searchBitmap: li          9, 0            # useless words = 0
                li          0, 0            # make sure r0 = 0
getNextword:    lwzx        8, 4, 3         # get last accessed word
                addi        9, 9, 1         # increase count of useless words
                cmpwi       9, 0x1000       # has the number of useless words exceeded the number of
                                            # words in the bitmap?
                bge         error           # if so, report back an error condition
```

Appendix-continued

|  | | | |
|---|---|---|---|
|  | cmpwi | 8, 0 | # is last accessed word = 0? (i.e. is it full?) |
|  | bne | beginSearch | # if not, we need to begin a search |
|  | addi | 4, 4, 4 | # add four to the current word offset (about to get next<br># word) |
|  | andi. | 4, 4, 0x1FFC | # offset wraps around at 2K |
|  | b | getNextWord | # fetch next word |
| error: | li | 3, 0xFFFFFFFF | # otherwise, let caller know there was an error. |
|  | blr |  | # return to caller |
| beginSearch: | cntlzw | 10, 8 | # get count of leading zeros in current word |
| savePosition: | mr | 6, 4 | # save pointer to contiguous (?) block word |
|  | mr | 7, 10 | # save pointer to starting bit of contiguous (?) block |
|  | cmpwi | 10, 0 | # does the word have no lesding zeros? |
|  | bne | contCheck | # if not, continue the check |
|  | not | 12, 8 | # if so, then r12 gets an inverted copy of r8 |
|  | b | contCheck2 | # ...and we jump to another point |
| contCheck: | addi | 11, 7, -1 | # get absolute bit pos of last leading zero |
|  | maskg | 12, 0, 11 | # mask out leading zeros |
|  | not | 12, 12 | # invert mask |
|  | andc | 12, 12, 8 | # invert current word and mask out leading zeros |
| contCheck2: | cntlzw | 10, 12 | # get count of leading zeros in masked end inverted word |
|  | subf | 11, 7, 10 | # lz count 2 − lz count 1 = # of consecutive ones after<br># leading zeros |
|  | cmpw | 11, 5 | # is the current ones count >= number of needed pages? |
|  | bge | updateBitmap | # if it is, we have found a contiguous section -- update the<br># bitmap |
|  | cmpwi | 10, 32 | # is second leading zeros count = 32? (i.e. have we examined<br># a whole word?) |
|  | beq | needMoreWords | # if so, we need to check additional words for contiguous<br># ones |
| prepForNewSrch: | li | 11, 31 | # place the number 31 into reg. 11 (which is going to be<br># reused anyway) |
|  | maskg | 12, 10, 11 | # generate a mask that will protect bits we haven't looked<br># at yet |
|  | and | 8, 8, 12 | # clear bits we already looked at in current word |
|  | cntlzw | 10, 8 | # get count of leading zeros (to see if there are no more<br># ones bits left) |
|  | cmpwi | 10, 32 | # are there any ones bits left? |
|  | bne | savePosition | # if there additional ones bits left in the word continue<br># search |
|  | addi | 4, 4, 4 | # otherwise, add 4 to word pointer |
|  | andi. | 4, 4, 0x1FFC | # offset wraps around at 2K |
|  | b | getNextWord | # get another word |
| needMoreWords: | addi | 4, 4, 4 | # increment word pointer |
|  | andi. | 4, 4, 0x1FFC | # offset wraps around at 2K |
|  | lwzx | 8, 4, 3 | # get new word |
|  | addi | 9, 9, 1 | # increase number of useless words |
|  | cmpwi | 9, 0x1000 | # have we checked through more words than are in the bitmap? |
|  | bgt | error | # if so, error! |
|  | not | 8, 8 | # if not, invert current word (inverting makes leading ones<br># to zeros) |
|  | cntlzw | 10, 8 | # get the number of leading zeros |
|  | add | 11, 11, 10 | # add the number of leading zeros to the current contiguous<br># ones count |
|  | cmpw | 11, 5 | # have we found a suitable block? |
|  | bge | updateBitmap | # if so, update the bitmap |
|  | cmpwi | 10, 32 | # if not, then have we read through a complete word? |
|  | beq | needMoreWords | # if so, then get another word |
|  | not | 8, 8 | # invert (and therefore restore) current word |
|  | b | prepForNewSrch | # prepare for a new search |
| updateBitmap: | mr | 10, 6 | # copy word pointer reg. |
|  | lwzx | 8, 10, 3 | # get word with Start of contiguous block |
|  | subfic | 9, 7, 32 | # get number of bits right of (and including) starting bit<br># in word |
|  | capw | 9, 5 | # are the number of bits in reg 9 >= tbe number of required<br># bits? |
|  | bit | notDone | # if it's less, then we need another word |
|  | addi | 11, 5, -1 | # otherwise, get the number of bits needed and sub. 1 (prep.<br># for abs. addrsng) |
|  | add | 11, 11, 7 | # add the absolute starting bit pos to get tbe absolute end<br># bit position |
|  | maskg | 12, 7, 11 | # generate the appropriate inverted mask |
|  | andc | 8, 8, 12 | # invert mask and AND it with the current word |
|  | stwx | 8, 10, 3 | # store back the word |
|  | sliq | 7, 7, 16 | # rotate the starting bit pos. 16 bits to form (later) a<br># composite start addr. |
|  | or | 3, 6, 7 | # OR in the starting word offset and send it back to the<br># caller |
|  | blr |  | # return back to the caller |
| notDone: | cmpwi | 7, 0 | # is leading zeros word = 0? |

Appendix-continued

|  | bne | notDone.1 | # if there are no leading zeros, clear word and proceed |
|---|---|---|---|
|  | li | 8, 0 | # load reg. 8 with zero |
|  | stwx | 8, 10, 3 | # write back a cleared word |
|  | b | needMoreWords2 | # continue fetching words |
| notDone.1: | addi | 11, 7, -1 | # get absolute bit pos of last leading zero |
|  | maskg | 12, 0, 11 | # generate mask that masks out leading zeros |
|  | and | 8, 8, 12 | # clear app. bits in word to signify that they're in use |
|  | stwx | 8, 10, 3 | # write back word into bitmap |
| needMoreWords2: | addi | 10, 10, 4 | # increment word pointer |
|  | andi. | 10, 10, 0x1FFC | # mask word pointer in case we need to wrap around to # beginning of bitmap |
|  | lwzx | 8, 10, 3 | # get next word |
|  | addi | 11, 9, 32 | # add 32 to a copy of the number of already updated bits |
|  | cmpw | 11, 5 | # are the number of already updated bits > tbe number of # reguired bits? |
|  | bgt | returnAddr | # if so, we need to update the word appropriately and return # the start. addr |
|  | li | 8, 0 | # if not, we need to clear the word and store it back into # the bitmap |
|  | stwx | 8, 10, 3 | # store back cleared word (to indicate that the bits are in # use) |
|  | addi | 9, 9, 32 | # add 32 to number of already updated bits |
|  | cmpw | 9, 5 | # have we updated the last word on a word boundary? |
|  | bne | needMoreWords2 | # no - - keep getting words |
|  | b | output | # we're done -- output starting address |
| returnAddr: | subf | 11, 5, 9 | # get number of remaining bits to clear |
|  | abs | 11, 11 | # take absolute value |
|  | li | 12, 31 | # prepare for maskg (place 31 in r12 to make a mask that # goes to end of word) |
|  | maskg | 12, 11, 12 | # make a mask that protects bits to the right of those # needing zeroing |
|  | and | 8, 8, 12 | # clear out lower bits (which indicates they're in use) |
|  | stwx | 8, 10, 3 | # write back word into bitmap |
| output: | sliq | 7, 7, 16 | # shift contiguous block bit pointer to the left by 16 bits |
|  | or | 3, 6, 7 | # OR the shifted pointer with the 11-bit word pointer |
|  | blr |  | # return composite address to caller |
|  | .globl | ._freeBmpEntries |  |
| ._freeBmpEntries: | li | 0, 0 | # clear reg. 0 |
|  | sriq | 7, 4, 16 | # put the bit offset into reg. 7 |
|  | andi. | 6, 4, 0xFFFF | # mask out the word offset and place it in reg. 6 |
|  | mr | 10, 6 | # copy word pointer reg. |
|  | lwzx | 8, 10, 3 | # get word with start of contiguous block |
|  | subfic | 9, 7, 32 | # get number of bits right of (and including) starting bit # in word |
|  | cmpw | 9, 5 | # are the nunber of bits in reg. 9 >= the number of required # bits? |
|  | blt | notDone2 | # if it's less, then we need another word |
|  | addi | 11, 5, -1 | # otherwise, get the number of bits needed and sub. 1 (prep. # for aba. addrsng) |
|  | add | 11, 11, 7 | # add the absolute starting bit pos to get the absolute end # bit position |
|  | maskg | 12, 7, 11 | # generate the appropriate mask |
|  | or | 8, 8, 12 | # OR it with the current word |
|  | stwx | 8. 10, 3 | # store back the word |
|  | blr |  | # return back to the caller |
| notDone2. | capwi | 7, 0 | # is leading words reg. = 0? |
|  | bne | notDone2.1 | # if there are no leading zeros, set the word and proceed |
|  | li | 8, 0xFFFFFFFF | # set the word |
|  | stwx | 8, 10, 3 | # and write it back |
|  | b | needMoreWords3 | # and continue fetching more words |
| notDone2.1: | addi | 11, 7, -1 | # get absolute bit pos of last leading zero |
|  | maskg | 12, 0, 11 | # generate mask that masks out leading zeros |
|  | orr | 8, 8, 12 | # set app. bits in word to signify that they're in use |
|  | stwx | 8, 10, 3 | # write back word into bitmap |
| needMoreWords3: | addi | 10, 10, 4 | # increment word pointer |
|  | andi. | 10, 10, 0x1FFC | # mask word pointer in case we need to wrap around to # beginning of bitmap |
|  | lwzx | 8, 10, 3 | # get next word |
|  | addi | 11, 9, 32 | # add 32 to a copy of the number of already updated bits |
|  | cmpw | 11, 5 | # are the number of already updated bits > the number of # required bits? |
|  | bgt | returnAddr2 | # if so, we nead to update the word appropriately and return # the start. addr |
|  | li | 8, 0xFFFFFFFF | # if not, we need to set the word and store it back into the # bitmap |
|  | stwx | 8, 10, 3 | # store back set word (to indicate that the bits are # available) |
|  | addi | 9, 9, 32 | # add 32 to number of already updated bits |
|  | cmpw | 9, 5 | # have we updated the laat word on a word boundary? |

Appendix-continued

| | | | |
|---|---|---|---|
| | bne | needMoreWords3 | # no -- keep getting words |
| | blr | | # we're done - - return to caller |
| returnAddr2: | subf | 11, 5, 9 | # get number of remaining bits to clear |
| | abs | 11, 11 | # take absolute value |
| | li | 12, 31 | # prepare for maskg (place 31 in r12 to make a mask that g |
| | | | # goes to end of word) |
| | maskg | 12, 11, 12 | # make a mask that protects bits to the right of those |
| | | | # needing zeroing |
| | orc | 8, 8, 12 | # set out lower bits (which indicates they're in use) |
| | stwx | 8, 10, 3 | # write back word into bitmap |
| | blr | | # return to caller |

Assembly Routines for VM.c and VM.h Support (VM.s)

| | | | |
|---|---|---|---|
| | .globl | .__getSDR1 | |
| | .globl | .__putSDR1 | |
| | .globl | .__tlbie | |
| | .globl | .__enablePaging | |
| | .globl | .__disablePaging | |
| | .globl | .__sync | |
| | .globl | .__isync | |
| | .globl | .__synchronize | |
| | .globl | .__getsR1 | |
| | .globl | .__getTime | |
| | .globl | .__getRTCL | |
| | .globl | .__getDEC | |
| | .globl | .__dcbf | |
| | .globl | .__dcbi | |
| .__getSDR1: | mfspr | 3, 25 | # Return Table Search Description Register |
| | blr | | |
| .__tlbie: | tlbie | 3 | # TLB Invalidate Entry |
| | blr | | |
| .__putSDR1: | mtspr | 25, 3 | # Put into Table Search Description Register |
| | blr | | |
| .__enablePaging: | sync | | |
| | sync | | |
| | sync | | |
| | isync | | |
| | isync | | |
| | isync | | |
| | mfmsr | 3 | |
| | ori | 3, 3, 0x30 | |
| | mtspr | 3 | # Turn on instruction and data paging |
| | sync | | |
| | sync | | |
| | sync | | |
| | isync | | |
| | isync | | |
| | isync | | |
| | blr | | |
| .__disablePaging | sync | | |
| | sync | | |
| | sync | | |
| | isync | | |
| | isync | | |
| | isync | | |
| | mfmsr | 3 | |
| | li | 4, 0xFFFFFFCF | |
| | and | 3, 3, 4 | # Turn off instruction and data paging |
| | mtmsr | 3 | |
| | sync | | |
| | sync | | |
| | sync | | |
| | isync | | |
| | isync | | |
| | isync | | |
| | blr | | |
| .__sync: | sync | | # Synchronize pipeline |
| | blr | | |
| .__isync: | isync | | # Instruction synchronize |
| | blr | | |
| .__getSR1: | mfsr | 3, 1 | # Get contents of Segment Register 1 |
| | blr | | |
| .__getTime: | | | # Get current time |
| | mfspr | 6, 4 | # get RTCU |
| | mfspr | 7, 5 | # get RTCL |
| | mfspr | 8, 4 | # get the RTCU again |
| | cmpw | 6, 8 | # has the RTCU changed? |
| | bne | .__getTime | # if RTCU has changed, we need to refetch? |
| | stw | 6, 0(3) | # write RTCU to pointer stored in r3 |

Appendix-continued

```
                        stw         7, 0(4)              # write RTCL to pointer stored in r4
                        blr
.__getRTCL:             mfspr       3, 5                 # get RTCL
                        blr
.__getDEC:              mfspr       3, 22
                        blr
.__dcbf:                dcbf        3, 4                 # Data cache block flush
                        isync
                        blr
.__dcbi:                dcbi        3, 4                 # Data cache block invalidate
                        isync
                        blr
.__synchronize:         sync
                        sync
                        sync
                        isync
                        isync
                        isync
                        blr
```

Preprocessor Support for VM.c and VMMR.c routines (vm.h)

```c
include <stdio.h>
                                                          /* MISC. PTE BITS ------- */
# define pteValid           (1 << 31)
# define ptePrimaryHash     (1 << 6)
# define pteChanged         (1 << 7)
# define pteReferenced      (1 << 8)
                                                          /* MISC. VH MACROS ------ */
# define SEGREG(la)         ((la) >> 28)                  /* Extract segment reg. from logical address */
# define VSID(sv)           ((sv) & 0x00FFFFFF)           /* Extract virtual seg. ID from segment value */
# define API(la)            (((la) & 0x0FC00000 >> 22)    /* Extract abb. page index from logical addr */
# define PI(la)             (((la) & 0x0FFFF000) >> 12)   /* Extract page index from logical address */
# define PAGEOFFSET(va)     ((la) & 0xFFF)                /* Extract page offset from logical address */
# define HTABORG()          (__getSDR1 () & 0xFFFF0000)   /* Extract hash table origin from SDR1 reg. */
# define HTABMASK()         (__getSDR1 () & 0x1FF)        /* Extract hash table mask from SDR1 reg. */
# define HASH(vsid, pi)     (((vsid) & 0x7FFFF)    pi)    /* Create primary hash */
# define HASH2(vsid, pi)    ~(((vsid) & 0x7FFFF)   pi)    /* Create secondary hash */
# define PTEGADDR(vsid, pi) (pteg_t *) (((HASH(vsid, pi) & ((HTABMASK() \
                            << 10) | 0x3FF)) << 6) | HTABORG())   /* Get primary PTEG physical address */
# define PTEG2ADDR(vsid, pi) (pteg_t *) (((HASH2(vsid, pi) & ((HTABMASK() \
                            << 10) | 0x3FF)) << 6) | HTABORG())   /* Get secondary PTEG physical address */
#define PTE0(vsid,hashtype,api) (((vsid) << 7) | ((hashtype) << 6) \
                            | (api))                      /* Build the first word of a PTE */
#define PTE1(ppn, wim, hist) (((ppn) << 12) | ((hist) << 7) | ((wim) << 4))
                                                          /* Build the second word of a PTE */
                                                          /* MISC. DEFINES ------- */
#define K                   1024
#define FALSE               0
#define TRUE                1
#define COMPLETED           0
#define NOT_COMPLETED       -1
                                                          /* MISC. TYPEDEFS ------ */
typedef struct {
    unsigned long pteWord0;
    unsigned long pteWord1;
} pte_t;
typedef unsigned int uint;
typedef unsigned long vaddr_t;                            /* Typedef for virtual address */
typedef unsigned long raddr_t;                            /* Typedef for real address */
typedef pte_t pteg_t[8];                                  /* Eight pte's to a pte group */
typedef pteg_t pageTable_t[];
```

Page Table Routines (VM.c)

```c
include <stdio.h>
#include "nap.h"
#include "napsys.h"
#include "napglob.h"
#include "nspstr.h"
#include "vm.h"
raddr_t * initVirtualMemory (raddr_t *, uint, uint, uint *, uint, uint);
int addPageTableEntry (uint, uint, uint, uint);
int deletePageTableEntry (uint, uint);
uint getPteAttributes (uint, uint);
raddr_t * initVirtualMemory (raddr_t *pageTableAddr, uint kernelWordSize, uint memWordSize, uint * bitmapSize,
uint kernWim, uint pteWim)
{
    int i, pi, count;
    raddr_t *freeMemBitmapAddr;
    uint freeMemBitmapWordsize, htaborg, htabmask, sdr1;
    htabmask = 0xFFFFFFFF;
```

Appendix-continued

```
        count = memWordSize >> 21;
        while ((count >>= 1) != 0)
            htabmask <<= 1;
        htabmask = ~htabmask;
        htaborg = (uint) pageTableAddr;
        sdr1 = htaborg | htabmask;
        __putSDR1 (sdr1);
        __sync ();
        for (i = 0; i < (memWordSize >> 7); i++)          /* invalidate all entries in the page table */
            *(pageTableAddr + i) = 0;
        for (pi = 0; pi < (kernelWordSize >> 10); pi++)   /* virtual = real for kernel, including PT */
            if ((pi >= 512) && (pi < 640))                /* page table fixed at 2MB */
                addPageTableEntry (0, pi, pi, pteWim);
            else addPageTableEntry (0, pi, pi, kernWim);
        for (pi = 16320; pi < 16354; pi++)                /* NAP STACK NEEDS VIRTUAL = REAL MAPPING */
            addPageTableEntry (0, pi, pi, kernWim);
        freeMemBitmapAddr = pageTableAddr + (memWordSize >> 7);
        freeMemBitmapWordSize = memWordSize >> 15;
        *bitmapSize = freeMemBitmapWordSize;
        for (i = 0; i < freeMemBitmapWordSize; i++)       /* clear bitmap */
            *(freeMemBitmapAddr + i) = 0xFFFFFFFF;        /* of the page table */
        __sync();
        __enablePaging();
        return freeMentBitmapAddr;
}
int addPageTableEntry (uint vsid, uint pi, uint ppn, uint wim)
{
    int i = 0;
    uint hash, altHash, htabmask, htaborg;
    uint sdr1, api;
    pteg_t *ptegAddr, *pteg2Addr;
    hash = (vsid & 0x7FFFF) ^ pi;                         /* calculate primary hash */
    sdr1 = __getSDR1();                                   /* fetch contents of table SDR1 register */
    htabmask = sdr1 & 0x1FF;                              /* extract hash table mask from SDR1 reg. */
    htaborg = sdr1 & 0xFFFF0000;                          /* extract hash table origin from SDR1 reg */
    ptegAddr = (pteg_t *) (((hash & ((htabmask << 10)
                        | 0x3FF)) << 6) | htaborg);       /* calculate physicsl address of primary PTEG */
    do {
        if ((((*ptegAddr) [i].pteWord0 & 0x80000000) == FALSE) {  /* is the PTE valid ? */
            api = (pi & 0xFC00) >> 10;                    /* if not, let's add the entry here */
            (*ptegAddr) [i] .pteWord0 = PTE0 (vsid, 0, api);  /* write first pte word */
            (*ptegAddr) [i].pteWord1 = PTE1 (ppn, wim, 0);    /* wim = xxx, history bits = 00 */
            __sync ();                                    /* make sure updates have been written to memory */
            (*ptegAddr) [i].pteWord0 = (*ptegAddr) [i].pteWord0 | 0x80000000;  /* PTE is in place - - validate */
            return 0;                                     /* we've inserted a primary PTE - - we're done! */
        }
    } while (i++ < 7);

/* primary PTEG is not vacent - look at secondary */
    altHash = ~hash;                                      /* calculate secondary hash */
    pteg2Addr = (pteg_t *)  (((altHash & ((htabmask << 10)  /* calculate physical address of secondary PTEG */
                        | 0x3FF)) << 6) | htaborg);
    i = 0;                                                /* reset PTE counter */
    do {
        if ((((*pteg2Addr) [i].pteWord0 & 0x80000000) == FALSE) {  /* repeat above for the secondary PTEG */
            api = (pi & 0xFC00) >> 10;
            (*pteg2Addr) [i].pteWord0 = PTE0 (vsid, 1, api);
            (*pteg2Addr) [i].pteWord1 = PTE1 (ppn, wim, 0);
            __sync();
            (*pteg2Addr) [i].pteWord0 = (*pteg2Addr) [i].pteWord0 | 0x80000000;
            return 0;
        }
    } while (i++ <7);
    return 1;                                             /* time to evict an existing PTE (none left) */
}
int deletePageTableEntry (uint vsid, uint pi)
{
    int i = 0;
    uint hash. altHash, htabmask, htaborg;
    uint sdr1, api;
    uint currentPte, currentPteVsid, currentPteApi;
    pteg_t *ptegAddr, *pteg2Addr;
    hash = (vsid & 0x7FFFF) ^ pi;                         /* calculate primary hash */
    sdr1 = __getSDR1();                                   /* fetch contents of table SDR1 register */
    htabmask = sdr1 & 0x1FF;                              /* extract hash table mask from SDR1 reg. */
    htaborg = sdr1 a 0xFFFF0000;                          /* extract hash table origin from SDR1 reg. */
    ptegAddr = (pteg_t *)  (((hash & ((htabmask << 10)
                        | 0x3FF)) << 6) | htaborg);       /* calculate physical address of primary PTEG */
    for (i = 0; i < 8; i++) {                             /* check all 8 pte's */
        currentPte     = (*ptegAddr) [i].pteWord0;        /* fetch pte i at ptegAddr */
```

Appendix-continued

```
            currentPteVsid  = (currentPte & 0x7FFFFF80) >> 7;      /* extract the virtual segment id */
            currentPteApi   = (currentPte & 0x0000003F);           /* extract the abbreviated page index */
            api = (pi & 0xFC00) >> 10;                             /* calculate the API given the page index */
            if ((currentPtevsid == vsid) & (currentPteApi == api)) {
                                                                   /* if the vsid AND api match those of pte i, we */
                                                                   /* have a match! */
                (*ptegAddr) [i].pteWord0 = 0;                      /* if there's a match, invalidate the pte */
                _sync ();                                          /* synchronize the 601 */
                _tlbie ((*ptegAddr) [i].pteWord1);                 /* invaldte any 601 TLB entries with pte i's ppn */
                _sync();                                           /* synchronize the 601 (again) */
                return 0;                                          /* operation successful */
            }
        }
        altHash = ~hash;                                           /* calculate secondary hssh */
        pteg2Addr = (pteg_t *)   (((altHash & ((htabmask << 10)    /* calculate physical address of secondary PTEG */
                                | 0x3FF)) << 6) | htaborg);
        for (i = 0; i < 8; i++) {
            currentPte      = (*pteg2Addr) [i].pteWord0;           /* fetch pte i at the secondary pteg address */
            currentPteVsid  = (currentPte & 0x7FFFFF00) >> 7;      /* extract the virtual segment id */
            currentPteApi   = (currentPte & 0x0000003F);           /* extract the abbreviated page index */
            api = (pi & 0xFC00) >> 10;                             /* construct the API given the page index */
            if ((currentPteVsid == vsid) & currentPteApi == api)) {/* do we have a match ? */
                (*pteg2Addr) [i].pteWord0 = 0;                     /* YES - - invaldte the PTE in the secondary PTEG */
                _sync();                                           /* synchronize the 601 */
                _tlbie ((*pteg2Addr) [i].pteWord1);                /* invalidate any matching TLB's */
                _sync();                                           /* synchronize again */
                return 0;                                          /* operation successful */
            }
        }
        return 1;                                                  /* PTE has no entry in the page table! ERROR! */
}
uint getPteAttributes (uint vsid, uint pi)
{
    int i = 0;
    uint hash, altHash, htabmask, htaborg;
    uint sdr1, api;
    uint currentPte, currentPtevsid, currentPteApi;
    pteg_t *ptegAddr, *pteg2Addr;
    hash = (vsid & 0x7FFFF) ^ pi;                                  /* calculate primary hash */
    sdr1 = _getSDR1();                                             /* fetch contents of table SDR1 register */
    htabmask = sdr1 & 0x1FF;                                       /* extract hash table mask from SDR1 reg. */
    htaborg = sdr1 & 0xFFFF0000;                                   /* extract hash table origin from SDR1 reg. */
    ptegAddr = (pteg_t *)    (((hash & ((htabmask << 10)
                             | 0x3FF)) << 6) | (htaborg);          /* calculate physical address of primary PTEG */
    for (i = 0; i < 8; i++) {
        currentPte      = (*ptegAddr) [i].pteWord0;                /* fetch pte i at ptegAddr */
        currentPteVsid  = (currentPte & 0x7FFFFF80) >> 7;          /* extract the virtual segment id */
        currentPteApi   = (currentPte & 0x0000003F);               /* extract the abbreviated page index */
        api = (pi & 0xFC00) >> 10;
        if (((currentPte & Dx80000000) != FALSE) & (currentPteVsid == vsid)
                         & (currentPteApi == api))                 /* is the pte valid? do the vsid AND api */
                                                                   /* match those of pte i? */
            return ((*ptegAddr) [i].pteWord1);                     /* if so, return the pte's attributes word */
    }
    altHash = ~hash;                                               /* calculate secondary hash */
    pteg2Addr = (pteg_t *)   (((altHash & ((htabmask << 10)        /* calculate physical address of secondary PTEG */
                             | 0x3FF)) << 6) | htaborg);
    for (i = 0; i < 8; i++) {
        currentPte      = (*pteg2Addr) [i].pteWord0;               /* fetch pte i at pteg2Addr */
        currentPteVsid  = (currentPte & 0x7FFFFF80) >> 7;          /* extract the virtual segment id */
        currentPteApi   = (currentPte & 0x0000003F);               /* extract the abbreviated page index */
        api = (pi & 0xFC00) >> 10;
        if (((currentPte & 0x80000000) != FALSE) & (currentPteVsid == vsid)
                         & (currentPteApi == api))                 /* is the pte valid? do the vsid AND api */
                                                                   /* match those of pte i? */
            return ((*pteg2Addr) [i].pteWord1);                    /* if so, return the pte's attributes word */
    }
    return 1;                                                      /* The virtual address is not mapped; ERROR! */
}
```

<u>VMMR Routines (VMMR.c)</u>

```
#include <stdio.h>
#include "nap.h"
#include "napsys.h"
#include "napglob.h"
#include "napstr.h"
#include "../vm/vm.h"
extern int addPageTableEntry (uint, uint, uint, uint);
extern int deletePageTableEntry (uint, uint);
```

Appendix-continued

```
extern unsigned int getPteAttributes (uint, uint);
vaddr_t * ioBufVMemAlloc (raddr_t *, raddr_t [], uint, uint, int, uint);
int ioBufVMemDealloc (raddr_t *, vaddr_t [], uint, uint);
void ioBufVMemInit (raddr_t *);
void ioBufVMemInit (raddr_t * ioBufFreeListAddr)
{
    unsigned long i;
    put_sr1 (0x00FFFFFF);                                      /* arbitrarily map buffers to last virt. segment */
                                                                /* in virt. space */
    for (i = 0; i < 2048; i++) {                                /* one 256 MB segment is mapped by 2K words */
        *(ioBufFreeListAddr. + i) = 0xFFFFFFFF;                 /* clear I/O buffer free list (1=avail.0=not) */
    }
}
vaddr_t * ioBufVMemAlloc (raddr_t * ioBufFreeListAddr, raddr_t ppnArray[], uint bufSize,
                            uint ppnArraysize, int indexReset, uint wim)
{
    static uint wordOffset = 0;
    uint vsid, pi. bitOffset;
    uint j, k, compStartAddr, pagesToAlloc;
    pagesToAlloc = (bufSize >> 12) * ppnArraySize;              /* calculate number of contiguous pages to * /
                                                                /* allocate in bitmap */
    if (indexReaet) wordOffset = 0;                             /* reset word offset if requested */
    compStartAddr = _searchBitmap (ioBufFreeListAddr, wordOffset, pagesToAlloc);
                                                                /* search the bitmap and get back a composite */
                                                                /* start address */
    if (compStartAddr == 0xFFFFFFFF) return 0;                  /* if there are no entries left, ERROR! */
    wordOffset = (compStartAddr & 0xFFFF) >> 2;                 /* word offset is the lower halfword of the */
                                                                /* comp. addr / 4 */
    bitOffset = compStartAddr >> 16;                            /* bit offset is the upper halfword of the */
                                                                /* comp. addr */
    pi = (wordOffset << 5) + bitOffset;                         /* page index is the word offset x 32 + */
                                                                /* bit offset */
    vsid = get_sr1() & 0x00FFFFFF;                              /* get the virtual segment id */
    for (j = 0; j < ppnArraySize; j++) {
    for (k = 0; k < bufSize >> 12; k++) {
        if (addPageTableEntry (vsid, ((pi + j*(bufSize >> 12) + k)) & 0xFFFF,
                               (ppnArray[j] >> 12) + k, wim))
                                                                /* add a page table entry */
            return (vaddr_t *) -1;                              /* we can't add a page table entry - - ERROR! */
        }
    }
    return (vaddr_t *) (0x10000000 | (pi << 12));
}
int ioBufVMemDealloc (raddr_t * ioBufFreeListAddr, vaddr_t vaArray[], uint bufSize, uint vaArraySize)
{
    rsddr_t paddr;
    uint vsid, pi;
    int i, j;
    vsid = get_sr1() & 0x00FFFFFF;                              /* get vsid */
    for (i = 0; i < vaArraySize; i++) {                         /* check all virt. addresses in the psssed array */
        pi = (vaArray[i] & 0x0FFFFFFF) >> 12;                   /* extract page index from the virtual address */
        paddr = getPteAttributes (vsid, pi) >> 12;              /* extract the phys. addr. from the PTE at */
                                                                /* (vsid, pi) */
        for (j = 0; j < (bufSize >> 12); j++)                   /* clear entries in the word list */
            if (deletePageTableEntry (vsid, pi + j)) return -1;
        _freeBmpEntries   (ioBufFreeListAddr, ((pi & 0x1F) << 16) | ((pi >> 5) << 2),
                                    (bufSize >> 12));
        vaArray[i] = paddr;                                     /* update passed array with physical addresses */
    }
    return 0;
}
```

What is claimed is:

1. A method for concatenating discontiguous memory pages, said method comprising the steps:

receiving into a transfer buffer a block of data that exceeds the size of a system page;

storing the block of data using a processor to two or more system memory pages of a memory, each system memory page having a location identified by a physical address;

identifying at least one bitmap having bits representing a fixed number of contiguous virtual memory pages of an area of unused virtual memory, the fixed number of contiguous virtual memory pages being equal to or greater than the number of virtual memory pages required to store the block of data during the duration of the concatenating method;

storing the block of data using the processor to two or more of the fixed number of contiguous virtual memory pages;

assigning virtual addresses to the two or more system memory pages where each virtual address identifies a location in the memory of a virtual memory page; and determining the location of the block of data stored in the two or more contiguous virtual memory pages by mapping the two or more system memory pages to their assigned contiguous virtual addresses.

2. The method of claim 1, wherein the two or more system memory pages are physically disjunct.

3. The method of claim 1, wherein a hardware memory page table includes virtual-to-real address mappings for mapping the two or more system memory pages to their assigned contiguous virtual addresses.

4. A system for concatenating discontiguous memory pages in a processor comprising:

a receiver for receiving at least one block of data that exceeds the size of a memory page within said processor;

a physical storage area having a plurality of physical addresses each identifying the location of a physical memory page, said at least one block of data is stored within two or more physical memory pages;

a virtual storage area having a plurality of virtual addresses each identifying the location of a corresponding virtual memory page;

at least one bitmap having bits representing a fixed number of contiguous virtual memory pages of the virtual storage area during the duration of a concatenating method, said at least one block of data is stored within two or more of the fixed number of contiguous virtual memory pages; and at least one memory page table having virtual-to-real address mappings for tracking the location of the at least one block of data in the virtual storage area.

5. The system of claim 4, wherein the two or more system memory pages are physically disjunct.

6. The system of claim 4, wherein the block of data is a network message transfer unit (MTU).

7. The system of claim 4, wherein the processor updates the at least one memory page table during the execution of a process.

8. The system of claim 4, wherein said at least one bitmap represents said fixed number of contiguous virtual memory pages in some reserved area of the virtual storage area set aside by an operating system.

9. The system of claim 4, wherein a protocol stack is used to temporarily store said at least one block of data before said at least one block of data is stored in said virtual storage area.

10. A system for concatenating and reassembling discontiguous pages via virtual memory address reassignment, said system comprising:

means for receiving a block of data that exceeds a size of the processor's memory page;

means for writing portions of the block of data to two or more system memory pages so that the entire data block is stored using two or more system memory pages; and means for assigning contiguous virtual addresses to the two or more system memory pages wherein the contiguous virtual addresses belong to a group, the group includes a fixed number of contiguous virtual addresses which is equal to or greater than the number of system memory pages used to write portions of the block of data during the duration of a concatenating method.

11. The system of claim 10, wherein the two or more system memory pages are physically disjunct.

12. The system of claim 10, wherein a hardware memory page table contains virtual-to-real address mappings for mapping the two or more system memory pages to their assigned contiguous virtual addresses.

* * * * *